United States Patent
Hausladen et al.

(10) Patent No.: US 9,579,693 B2
(45) Date of Patent: Feb. 28, 2017

(54) METHOD AND SYSTEM FOR ARRANGING A PLURALITY OF ARTICLES MOVED IN A MASS FLOW

(71) Applicant: Krones Aktiengesellschaft, Neutraubling (DE)

(72) Inventors: Wolfgang Hausladen, Mötzing (DE); Josef Mayer, Regensburg (DE); Josef Deglmann, Neutraubling (DE); Michael Jogsch, Barbing (DE)

(73) Assignee: Krones Aktiengesellschaft, Neutraubling (DE)

( * ) Notice: Subject to any disclaimer, the term of this patent is extended or adjusted under 35 U.S.C. 154(b) by 0 days.

(21) Appl. No.: 14/358,288

(22) PCT Filed: Sep. 27, 2012

(86) PCT No.: PCT/EP2012/069143
§ 371 (c)(1),
(2) Date: May 15, 2014

(87) PCT Pub. No.: WO2013/079244
PCT Pub. Date: Jun. 6, 2013

(65) Prior Publication Data
US 2014/0311861 A1 Oct. 23, 2014

(30) Foreign Application Priority Data

Nov. 28, 2011 (DE) .................. 10 2011 055 780

(51) Int. Cl.
*B07C 5/38* (2006.01)
*B07C 5/34* (2006.01)
(Continued)

(52) U.S. Cl.
CPC .............. *B07C 5/38* (2013.01); *B07C 5/3412* (2013.01); *B07C 5/362* (2013.01); *B65G 47/261* (2013.01);
(Continued)

(58) Field of Classification Search
CPC .......... B07C 5/38; B07C 5/362; B07C 5/3412
See application file for complete search history.

(56) References Cited

U.S. PATENT DOCUMENTS 2,728,466 A * 12/1955 Postlewaite .......... B65G 47/503
198/349.3
3,627,127 A * 12/1971 Whiteford ................. B07C 5/28
209/566
(Continued)

FOREIGN PATENT DOCUMENTS

| DE | 2155120 | 11/1971 |
|---|---|---|
| DE | 3127008 | 1/1983 |

(Continued)

OTHER PUBLICATIONS

PCT/EP2012/069143—Jun. 12, 2014 IPR—English Translation—Krones.
(Continued)

*Primary Examiner* — Thomas Randazzo
(74) *Attorney, Agent, or Firm* — Simmons Perrine Moyer Bergman PLC

(57) ABSTRACT

Disclosed are a method and a system (1) for arranging a plurality of articles moved in at least one mass flow (M1, M2). Articles designed identically in respect of an allocation feature (A, B, C) are fed to a separate buffer station (P1, P2, P3) from the at least one mass flow (M1, M2) and stored in the buffer station (P1, P2, P3). A specified compilation (Z1, Z2) of articles is then formed wherein stored articles are removed from one or more of the buffer stations (P1, P2, P3)
(Continued)

in consideration of the specified compilation (Z1, Z2) and forwarded and/or guided to a handling station (10) in a defined sequence and/or arrangement.

7 Claims, 3 Drawing Sheets

(51) Int. Cl.
*B07C 5/36* (2006.01)
*B65G 47/51* (2006.01)
*B65G 47/26* (2006.01)
*B65G 47/84* (2006.01)

(52) U.S. Cl.
CPC ........ *B65G 47/5113* (2013.01); *B65G 47/846* (2013.01)

(56) References Cited

U.S. PATENT DOCUMENTS

| | | | |
|---|---|---|---|
| 4,239,434 A | 12/1980 | Gannon | |
| 4,414,566 A * | 11/1983 | Peyton | B07C 5/10 198/340 |
| 4,457,434 A * | 7/1984 | Brown | B07C 5/10 198/380 |
| 4,651,879 A * | 3/1987 | Harris | B07C 5/126 198/803.7 |
| 4,811,551 A * | 3/1989 | Nambu | A01K 43/00 53/155 |
| 5,238,122 A * | 8/1993 | Hart | B65G 1/137 209/555 |
| 5,713,403 A * | 2/1998 | Clusserath | B65C 3/16 141/101 |
| 5,845,758 A | 12/1998 | Bryant et al. | |
| 5,903,341 A * | 5/1999 | Perry | B07C 5/3422 209/587 |
| 6,213,309 B1 | 4/2001 | Dadisho | |
| 6,315,103 B1 * | 11/2001 | Boucherie | A46D 3/085 198/395 |
| 6,959,802 B1 | 11/2005 | Garvey | |
| 7,237,668 B2 * | 7/2007 | Gamberini | B65B 25/146 198/369.1 |
| 7,672,752 B2 * | 3/2010 | Blaine | A22C 7/00 700/213 |
| 7,960,668 B2 | 6/2011 | Fethke et al. | |
| 8,030,588 B2 * | 10/2011 | Culp | B07C 5/3412 209/552 |
| 8,307,977 B2 | 11/2012 | Nguyen et al. | |
| 8,317,032 B2 * | 11/2012 | Crezee | B07C 5/36 209/505 |
| 8,688,267 B2 * | 4/2014 | Blaine | B07C 5/342 356/606 |
| 8,731,711 B1 * | 5/2014 | Joplin | B21B 41/00 700/213 |
| 8,785,800 B2 * | 7/2014 | Berdelle-Hilge | B07C 3/02 209/583 |
| 8,931,616 B2 * | 1/2015 | Maier | A46D 3/082 198/347.1 |
| 8,985,341 B2 * | 3/2015 | Lapeyre | B07C 5/00 209/546 |
| 2006/0151288 A1 | 7/2006 | Reznik et al. | |
| 2010/0037557 A1 * | 2/2010 | Wilhelm | B65B 7/2807 53/331.5 |

FOREIGN PATENT DOCUMENTS

| | | | |
|---|---|---|---|
| DE | 4442586 | 6/1996 | |
| DE | 10036297 | 2/2002 | |
| DE | 202006003690 | 9/2007 | |
| DE | 102009017343 | 10/2010 | |
| EP | 1645340 | 4/2006 | |
| EP | 2301867 | 3/2011 | |
| FR | 2438608 | 10/1979 | |
| GB | 1274753 | 5/1972 | |
| GB | 2005885 | 4/1979 | |
| GB | 2005885 A * | 4/1979 | .......... B07C 5/3412 |
| WO | 0110754 | 2/2001 | |
| WO | 2011141450 | 11/2011 | |

OTHER PUBLICATIONS

State Intellectual Property Office of the People's Republic of China, Application No. 201280058490.X, Notification of First Office Action dated Mar. 30, 2015.

European Patent Application Office Action—EP 12 775 193.1-1707—Feb. 1, 2016.

DE102011055780.6—German Search Report for Application filed May 29, 2012.

PCT/EP2012/069143—ISR Search Report for Application filed Nov. 30, 2012.

\* cited by examiner

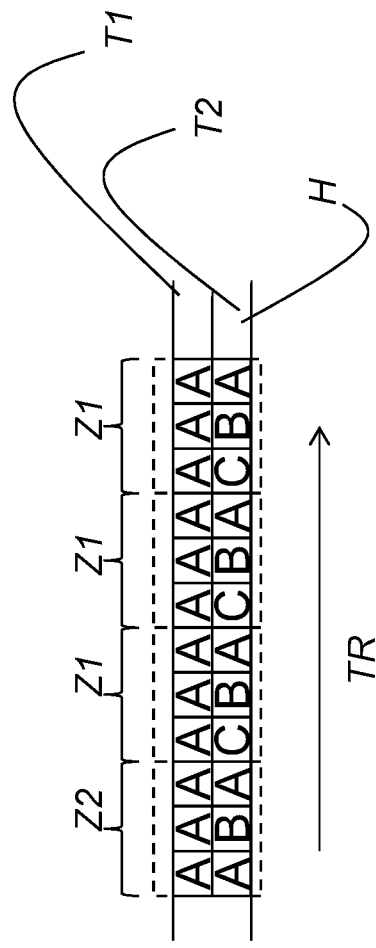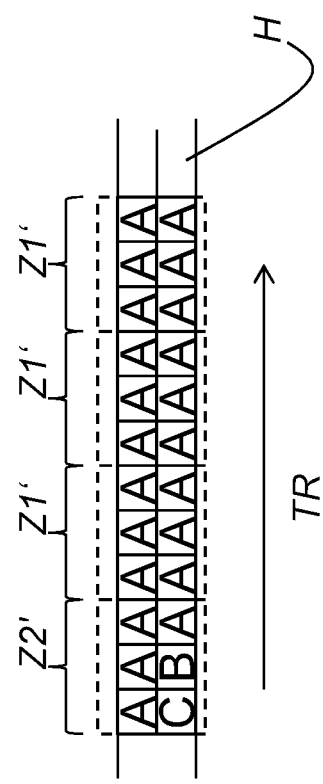
Fig. 2a
Fig. 2b

METHOD AND SYSTEM FOR ARRANGING A PLURALITY OF ARTICLES MOVED IN A MASS FLOW

CLAIM OF PRIORITY

The present application claims the benefit of international application PCT/EP2012/069143, filed on Sep. 27, 2012, which in turn claims the benefit of German application DE 10 2011 055 780.6 filed on Nov. 28, 2011, both of which are incorporated by reference.

FIELD OF THE INVENTION

The present invention relates to a method and a system for arranging a plurality of articles being moved in a mass flow.

BACKGROUND

Predefined article compilations are frequently requested by the packaging industry for use as retail units. In particular in the beverage industry, there have for some time been efforts to enable the sale of different types of beverages in a specified compilation, for instance in pre-assorted retail packages. From prior art, methods are known for single-variety production with subsequent picking operations. Alternatives that may be employed for this purpose are distribution devices which enable the single-variety conveyance of products, for instance beverage containers. Such a distribution device is shown, for instance, in DE 20 2006 003 690 U1. The DE utility model thus discloses a conveyor switch by means of which a stream of containers may be broken down into several further container streams. For this purpose, the distribution device shown in the DE utility model comprises several rotating disks, which are provided for receiving and forwarding containers. In the process of arranging the containers for a defined compilation, situations may occur where not all required containers are immediately available at all times. This may result in idle running or waiting time before a required variety is available again.

SUMMARY OF THE INVENTION

The task of the present invention is therefore to provide a method that enables arranging a plurality of different articles and, in particular, different containers or receptacles being conveyed in a mass flow, said arranging taking place without interruption and according to a defined specification. It is furthermore required that this method may be implemented in an easy and uncomplicated manner.

The task of the invention is solved by the methods and systems set forth in the claims.

The present invention relates to a method for arranging a plurality of articles being moved in a mass flow, wherein the articles, which are identically designated in respect of an allocation feature, are fed from the mass flow to a separate buffer station and stored in the buffer station. The term "to store" as used in the present invention does not necessarily indicate that the articles are stored in the buffer station without being moved. Articles may also pass through or be conducted through the buffer station.

The articles may be fed to the respective buffer station directly via a delivery device and/or a transfer device, for instance. Said delivery device and/or transfer device may possess one or more gripping and/or holding elements for transferring the articles to the respective buffer station. In a preferred embodiment of the present invention, the articles are first forwarded to and/or guided along their specific separate lane according to their allocation feature and then fed to a separate buffer station via their lanes. These lanes may, at least section-wise, run in parallel to each other.

According to the invention, the articles may take the form of products with containers and/or of products with receptacles, for instance. In this manner, it is possible that a first allocation feature is used to identify articles with a first container geometry and a second allocation feature is used to identify articles with a second container geometry. It is also possible that the first allocation feature relates to a first product and the second allocation feature relates to a second product wherein the products may in this context be contained in containers and/or receptacles having identical container geometries and/or receptacle geometries. It is furthermore possible that a first allocation feature is used to identify containers of a first container color and a second allocation feature is used to identify containers of a second container color. In the instance of the present method being applied in the beverage industry, for instance, it is possible that articles having a first allocation feature pertain to a first beverage variety and articles having a second allocation feature pertain to a second beverage variety. The articles may also be cosmetic products, for instance, wherein the article having a first or a second allocation feature relates to an additional product for a product compilation.

In one embodiment of the present invention, the articles may be moved in a mass flow along a horizontal conveying device in a standing position. In this context it is conceivable for the articles to be moved in the mass flow in a distribution that is inhomogeneous with regard to the allocation feature of the said articles. The articles may be moved in a single lane in the mass flow or also in multiple lanes in the mass flow, for instance. The articles may also be conveyed, at least section-wise, in their respective lanes along a horizontal conveying device. In practice, embodiments have proven successful that provide for the articles to be held and supported in an upright position by lateral guide rails while the articles are being conveyed in the mass flow and in the respective lanes. It is conceivable in the present context that articles may be moved in a row one after another or also next to each other in the mass flow and/or in the lanes.

It is additionally possible for the articles to be fed from the mass flow to their respective lanes through a delivery device and/or a transfer device, for instance. The delivery device and/or transfer device may comprise its own sensor system for detecting an allocation feature of the articles and may feed the articles to the respective lanes according to their allocation feature, for instance. The said sensor system may comprise one or more optical sensors. The delivery device and/or transfer device may be formed, for instance, by one or more selectively adjustable switches and/or by devices with gripper elements and/or by one or more distribution stars. In the instance of the delivery device and/or transfer device comprising its own sensor system, it is conceivable in a preferred embodiment form of the present invention that the delivery device and/or transfer device detects and ejects damaged and/or defective articles before they are fed to the buffer station. The delivery device and/or transfer device may, for instance, forward and/or conduct damaged and/or defective articles to a discharge lane. The discharge lane may also comprise a horizontal conveying device.

Alternative embodiment forms may comprise a plurality of mass flows, in which articles having different allocation features are moved. The delivery device and/or transfer device may be formed in such a manner, for instance, that it consecutively or simultaneously feeds the articles to the respective buffer station from several mass flows in consideration of the allocation features. In this instance, it is possible that there are at least two lanes, but three lanes, four lanes, or a plurality of lanes may also be possible. If there is a plurality of mass flows, it is possible to have only one common delivery device and/or transfer device for feeding the articles to the respective lanes. It is also conceivable that a separate delivery device and/or transfer device is provided for each individual mass flow or for several mass flows.

According to the invention, the method is provided in order to arrange articles into a specified compilation. The specified compilation may be defined in such a manner, for instance, that each compilation comprises only articles that are identical in respect of an allocation feature. The compilation may furthermore comprise several articles having a different allocation feature. In a preferred embodiment variant of the present invention, the compilation is defined both by the number of respective articles having a certain allocation feature and by the arrangement or position of these articles within the respective compilation.

As an initial step, a first compilation of articles may be formed over a certain period of time by means of the method according to the invention. The first article compilation may, in this instance, comprise a certain number of articles that are specified with regard to an allocation feature. The arrangement of articles within the compilation may furthermore be specified. Over a further period of time, another compilation may be formed from the articles. The second article compilation may, in this instance, also comprise a certain number of articles that are specified with regard to an allocation feature. Again, the arrangement of articles within the compilation may be specified in this case, as well. When applying the present method in the beverage industry, it is for instance possible for the first compilation to comprise a certain number of beverages of at least one first variety and a certain number of beverages of at least one further variety. It is furthermore possible that the second compilation comprises a certain number of beverages of at least one first variety and a certain number of beverages of at least one further variety. The arrangement of the articles and/or the transport sequence, in which they are forwarded and/or guided to a subsequent handling station, may also vary. The compilation may, in this instance, comprise those articles which are intended for packaging at a later point of time into a mixed assortment or a variety assortment with a plurality of different articles and, in particular, different beverage varieties.

For forming the compilation of articles, one or more articles are stored in their respective buffer station in dependence on their allocation feature. If the articles are forwarded from the mass flow to their respective lane in dependence on their allocation feature, each lane may be assigned exactly one buffer station. It is obvious to the expert that one or more of the lanes may also be assigned two or more buffer stations for storing articles. Furthermore, it is conceivable that the articles are guided and conveyed directly through the lanes to the respective buffer station. As articles with an identical allocation feature are conveyed in a lane of their own, there will be only articles having the identical allocation feature in the buffer station, as well. Each of the buffer stations may hold only identical beverage varieties, for instance.

Furthermore, stored articles are forwarded and/or guided from one or several of the buffer stations to a handling station in a defined sequence and/or arrangement in consideration of the specified compilation. It is conceivable that the process of forwarding and/or guiding the articles to a handling station is effected in an active or in a passive manner. In one embodiment of the present invention, it is possible for a lane end section to be located downstream from one or several of the buffer stations, in which lane end section articles with the identical allocation feature may accumulate up to the buffer station. As soon as one or more articles have been forwarded and/or guided from the respective lane end section to a handling station, the following article will move up from the respective buffer station into the lane end section and will thus be removed from the buffer station.

The defined sequence may be specified in such a manner that one or more articles with a first allocation feature are followed by one or more articles with a second allocation feature. Furthermore, the defined arrangement may be specified in such a manner that one or more articles with a first allocation feature are forwarded and/or guided to the handling station positioned next to each other or adjacent to one or more articles with a second allocation feature.

In a preferred embodiment of the present invention, one or several of the buffer stations are designed to be actively controllable in such a manner that when one or more articles are forwarded and/or guided to the handling station, articles with the same allocation feature are removed from the respective buffer station in a controlled process. The respective articles may likewise be guided to a lane end on being removed. The articles may also be accumulated in the section of the lane end.

In addition, there may be one delivery unit and/or transfer unit arranged downstream of all of the buffer stations, said delivery unit and/or transfer unit serving for transferring articles in consideration of the specified compilation to one or more horizontal conveying devices, which lead toward the handling station. The downstream delivery unit and/or transfer unit may be formed, for instance, by adjustable switches, by one or more gripper devices and/or by one or more distribution stars. Preferably, the method is designed in such a manner that the specified article compilation has been formed after the transfer of the articles to the one or more horizontal conveying devices. For instance, there may be one common, downstream delivery unit and/or transfer unit for all articles. Also, there may be a separate, downstream delivery unit and/or transfer unit for one or more articles with an identical allocation feature. The downstream delivery unit and/or transfer unit may also comprise a suitable sensor system for sorting out defective and/or damaged articles. In one embodiment of the present invention, defective and/or damaged articles may also be conducted to a discharge lane.

The handling station may involve one or more filling stations, for instance. It is likewise conceivable that the handling station involves a labeling station and/or a packaging station and/or one or more other stations. In this context it is possible that one handling station is followed by further handling stations.

Furthermore, it is conceivable that first all articles of a plurality of articles with a different allocation feature are processed and then conveyed together in the mass flow, before the identically designated articles are fed to their respective lane. In this context, the articles with a different allocation feature may be conveyed in the mass flow in a homogeneous distribution or in an inhomogeneous distribution. The articles may, for instance, be processed by one or more labeling apparatuses and/or filling apparatuses and/or further types of apparatuses before being fed to their respective buffer station.

Preferably, multiple processing stations are provided in parallel to each other for processing the articles. In this way, it is possible to forward the articles respectively to one processing station. If the multiple processing stations are, for instance, provided as labeling apparatuses, these labeling apparatuses may each comprise identical labeling units or different labeling units. If the labeling apparatuses comprise identical labeling units, it is not necessary to feed the articles selectively with regard to their allocation feature to the respective labeling apparatus. Rather, it is possible to feed the articles arbitrarily to one of the processing stations or one of the labeling apparatuses. The labeling apparatuses may comprise, for instance, a suitable sensor system for detecting the allocation feature and, based thereupon, select a suitable labeling unit for processing the articles in consideration of the respective allocation feature. In the instance of requiring different beverage varieties to be labeled, the labeling apparatus may be designed in such a manner that the labeling apparatus detects the beverage variety intended for being processed or labeled by means of a sensor system and may subsequently select a suitable labeling unit and/or in such a manner that the processing of the respective beverage variety is conducted at a suitable labeling unit.

In a further embodiment of the invention, it is possible that there is a plurality of labeling apparatuses and that the plurality of labeling apparatuses comprise different labeling units. In this embodiment form, the articles must be fed to the respectively suitable labeling apparatus selectively in consideration of their allocation feature. In this instance of selective feeding, suitable delivery units and/or transfer units may be provided, which detect the respective allocation feature by means of a sensor system and subsequently effect the articles to be forwarded and/or guided to the respective processing station or labeling apparatus. Arranged upstream of the delivery unit and/or transfer unit, there may also be a further processing station, from which articles are conveyed in the mass flow toward the delivery unit and/or transfer unit. The upstream processing station may take the form, for instance, of a container blow molding machine and/or a filling station and/or a further type of station.

It is obvious that there may be one or more horizontal conveying devices arranged upstream or downstream of the respective processing station so that it is possible to feed the articles to the respective processing station and/or to convey them away from the respective processing station before and/or after processing.

In a further embodiment of the present invention it is possible that on exceeding and/or falling below a certain number of articles stored in one or more buffer stations, a signal is output to a processing station arranged upstream of the buffer stations and/or to a manufacturing station arranged upstream of the buffer stations, so that the processing station and/or the manufacturing station subsequently either guides articles having the allocation feature intended for the respective buffer station via the mass flow to the respective buffer station or does not guide articles having the allocation feature intended for the respective buffer station via the mass flow to the respective buffer station. In this context, it is not necessary to guide articles from the respective processing station and/or manufacturing station directly to the mass flow, but it is rather also possible that these articles pass through one or more processing stations, as the case may be, before being fed into the mass flow. It is moreover conceivable that the one or more buffer stations are connected with a control unit, which, in consideration of an output signal, controls a processing station arranged upstream of the buffer stations and/or a manufacturing station arranged upstream of the buffer stations. As an example, a signal may be output on the number of articles stored in a buffer falling below a certain minimum threshold. It is also possible that a signal is output on the number of articles stored in a buffer exceeding a certain maximum threshold. The manufacturing station may be a container blow molding machine, for instance, and/or one or more other stations. The processing station may be a labeling apparatus, for instance, and/or one or more other apparatuses. It is conceivable that a processing station, for instance a labeling apparatus, as well as a manufacturing station, for instance a container blow molding machine, are both connected with a control unit, which controls the processing station and the manufacturing station.

The invention further relates to a system for arranging a plurality of articles being moved in a mass flow wherein articles identically designated in respect of an allocation feature are feedable from the mass flow via a first delivery unit and/or a first transfer unit to a separate buffer station. These buffer stations are designed in such a manner that articles may be removed from one or several of the buffer stations in consideration of a specified compilation and may be forwarded and/or guided via a delivery unit and/or a transfer unit arranged downstream of the buffer stations to a handling station in a defined sequence and/or in a defined arrangement. In analogy to the method according to the invention, the system according to the invention also allows articles to be processed before being fed to the respective buffer station. For this purpose, it is possible that two parallel processing stations are provided and, in particular, two labeling apparatuses, wherein at least one of the parallel labeling apparatuses comprises at least two different labeling units. If an article is to be processed by the respective labeling apparatus, the labeling apparatuses may comprise a suitable sensor system for detecting articles with regard to their allocation feature. After detecting the allocation feature, the labeling apparatus may select the respective labeling unit for the article intended for being processed.

In addition, it is possible that at least one handling station and/or one manufacturing station is arranged upstream of the processing stations or the labeling apparatuses. The handling station and/or the manufacturing station may be a container blow molding machine and/or a filling station and/or one or more other stations. In one embodiment of the present invention, it is possible that a delivery unit and/or a transfer unit is located downstream from this handling station and/or this manufacturing station, which delivery unit and/or transfer unit forwards the articles to the further processing stations or the further labeling apparatuses.

In a preferred embodiment form, at least one delivery unit and/or transfer unit takes the form of a distribution star with a sensor system for detecting the allocation feature.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIG. 2a shows a schematic view of two compilations of articles with different allocation features such as may be formed by the method according to the invention and the system according to the invention.

FIG. 2b shows a further schematic view of two compilations of articles with different allocation features such as may be formed by the method according to the invention and the system according to the invention.

DETAILED DESCRIPTION

Figure 1:
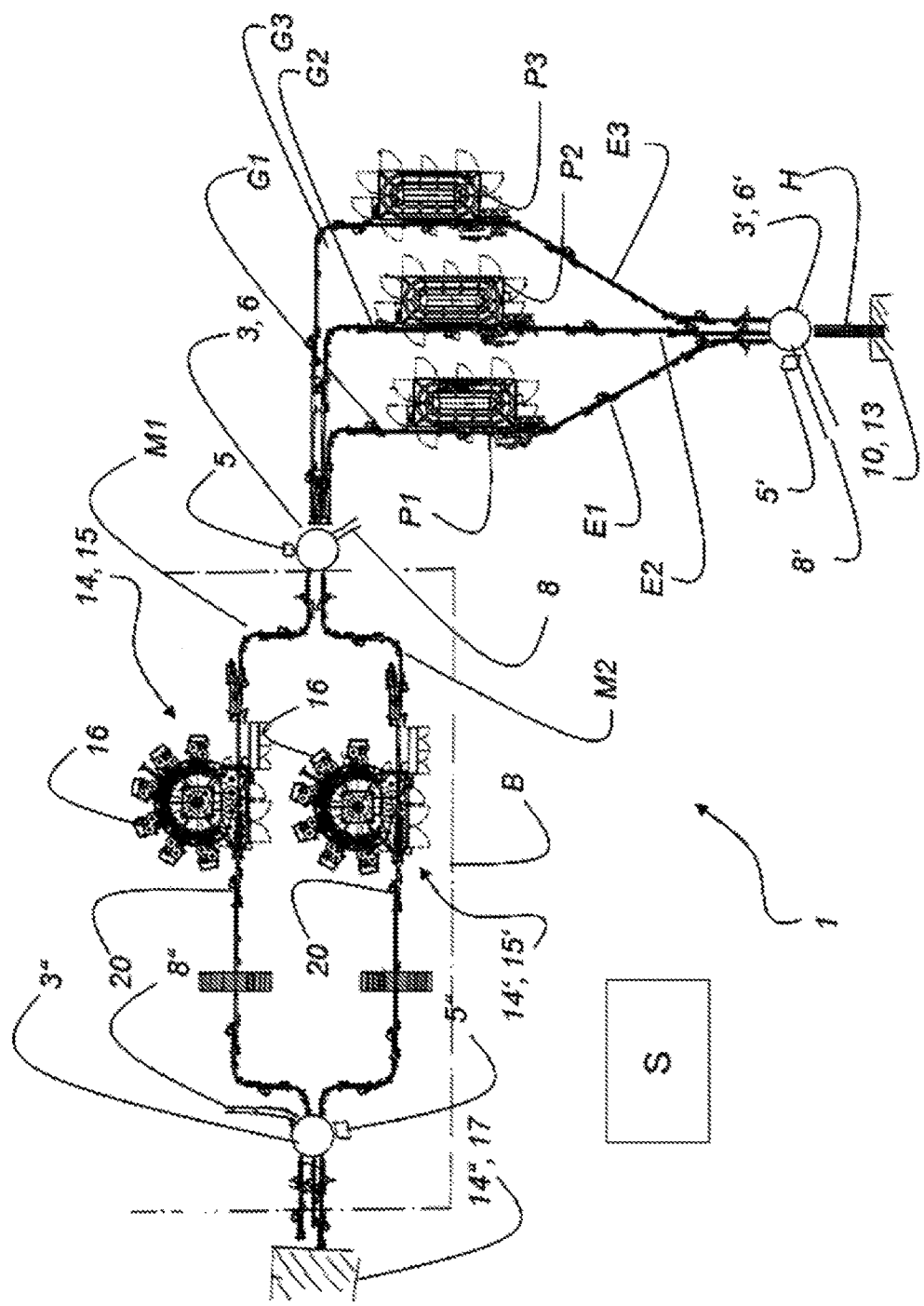
FIG. 1 shows a schematic view of an embodiment of a system according to the invention as it may be employed for an embodiment of a method according to the invention.

The same or equivalent elements of the invention are designated by identical reference characters. Furthermore and for the sake of clarity, only the reference characters relevant for describing the respective figure are provided. It should be understood that the detailed description and specific examples of the system and the method according to the invention, while indicating preferred embodiments, are intended for purposes of illustration only and are not intended to limit the scope of the invention.

FIG. 1 shows a schematic view of an embodiment of a system 1 according to the invention as it may be employed for an embodiment of a method according to the invention. The system 1 is intended for arranging a plurality of articles being moved in two parallel mass flows M1 and M2, which articles are designated with a different allocation feature A, B, and C and, in the present case, are designated as different beverage varieties (cf. FIG. 2). In the exemplary embodiment shown here, both the mass flow M1 and the mass flow M2 comprise a plurality of articles with different allocation features A, B, C, and different beverage varieties, respectively. Both mass flows M1 and M2 lead toward a common delivery unit and/or transfer unit 3, which in the present case takes the form of a distribution star 6 with an optical sensor system 5. By means of its sensor system 5, the distribution star 6 is capable of identifying articles in respect of their allocation feature A, B, or C. The delivery unit and/or transfer unit 3 or, respectively, the distribution star 6 is furthermore capable of feeding articles, which are identically designated in respect of the allocation feature A, B, or C, from the mass flow M1 and from the mass flow M2 along the lanes G1, G2, and G3, to a separate buffer station P1, P2, or P3. In addition, the delivery unit and/or transfer unit 3 or respectively the distribution star 6 is also capable by means of its sensor system 5 of detecting defective or damaged articles, and, rather than feeding them to the respective buffer station P1, P2, or P3, of ejecting them via the discharge belt 8. Thus, only articles with the identical allocation feature or of the same beverage variety are stored in the buffer stations P1, P2, and P3. Only articles with the allocation feature A are thus stored in the buffer station P1; only articles with the allocation feature B are stored in the buffer station P2; and only articles with the allocation feature C are stored in the buffer station C. Thus, only articles with the allocation feature A are conducted along the lane G1; only articles with the allocation feature B are conducted along the lane G2; and only articles with the allocation feature C are conducted along the lane G3. As can be seen in FIG. 1, one lane end section E1, E2, and E3 is respectively arranged downstream of each buffer station P1, P2, and P3. Only articles with the allocation feature A are located in the lane end section E1, while only articles with the allocation feature B are located in the lane end section E2; and only articles with the allocation feature C are located in the lane end section E3. A further delivery unit and/or transfer unit 3', which also takes the form of a distribution star 6', forwards articles with the allocation feature A, B, and C to the horizontal conveying device H in a defined sequence and arrangement (cf. FIG. 2) and conducts these articles to the handling station 10. The further delivery unit and/or transfer unit 3' has thus arranged the articles or, in the present case, the beverage varieties on the horizontal conveying device H in the specified compilation. By means of the sensor system 5', the further delivery unit and/or transfer unit 3' is also capable of detecting defective and/or damaged articles and of ejecting them via the discharge belt 8'. In the present case, the handling station 10 takes the form of a filling station 13, but it may just as well take the form of, for instance, a packaging station or a labeling apparatus or of another station. Articles or beverage varieties are removed from the buffer stations P1, P2, and P3 in such a manner that the further delivery unit and/or transfer unit 3' has access to the respective articles with the allocation feature A, B, and C or to the respective beverage variety, if required, in order to form the specified compilation. For instance, each lane end section E1, E2, and E3 may contain at least one article with the allocation feature A, B, or C, respectively. In practice, such systems 1 have proven successful wherein at least one article, preferably, however, a plurality of articles is lined up in each lane end section E1, E2, and E3 within the range of the further delivery unit and/or transfer unit 3'. The further delivery unit and/or transfer unit 3' may thus serve to form any compilation comprising articles with the allocation features A, B, and C on the horizontal conveying device H. The reference character S in FIG. 1 symbolizes a control unit. The control unit S is connected with the further delivery unit and/or transfer unit 3' and with the buffer stations P1, P2, and P3. When the further delivery unit and/or transfer unit 3' removes one or more articles from the lane end section E1 and/or E2 and/or E3, the control unit S outputs a signal to the respective buffer storage P1 and/or P2 and/or P3 to guide a further article to the respective lane end section E1 and/or E2 and/or E3, from which an article has been removed, or to remove a further article from the respective buffer station P1 and/or P2 and/or P3.

Arranged upstream of the delivery unit and/or transfer unit 3 in FIG. 1 are two parallel processing stations 14 and 14', which take the form of labeling apparatuses 15 and 15' in the present instance. Articles, after having been processed by the labeling apparatuses 15 and 15', are guided in the mass flow M1 or M2 to the delivery unit and/or transfer unit 3. In the exemplary embodiment shown here, each labeling apparatus 15 and 15' comprises different labeling units 16 so that all articles with the allocation feature A, B, or C can be processed. For this purpose, each labeling apparatus 15 and 15' possesses its own sensor system 20 so that it is capable of selecting a suitable labeling unit 16 prior to processing an article in dependence on the allocation feature A, B, or C of the article. A third delivery unit and/or transfer unit 3" is also shown. In analogy to the delivery unit and/or transfer unit 3 and in analogy to the delivery unit and/or transfer unit 3' arranged downstream, the third delivery unit and/or transfer unit 3" also comprises a suitable sensor system 3" for detecting defective and/or damaged articles and ejecting them via the discharge belt 8". Since the labeling apparatuses 15 and 15' are provided for processing articles regardless of their allocation feature A, B, or C, the third delivery unit and/or transfer unit 3" may distribute the articles to the labeling apparatuses 15 or 15' arbitrarily, without taking the allocation feature A, B, or C of the articles into consideration. The third delivery unit and/or transfer unit 3" may, however, distribute the articles homogeneously in respect of their number to the processing stations 14 and 14'. If one of the two labeling apparatuses 15 or 15' or one of the two processing stations 14 or 14' is defective, the control unit S may control the third delivery unit and/or transfer unit 3" in such a manner that articles will only be forwarded or guided to the intact labeling apparatus 15 or 15' or to the intact processing station 14 or 14' until the defect has been repaired. During conversion operations on one of the labeling apparatuses 15 or 15', the embodiment of the control unit S as shown in FIG. 1 can control the third delivery unit and/or transfer unit 3" in such a manner that no articles will be forwarded or guided to the labeling apparatus 15 or 15' while it is undergoing conversion. As the processing stations 14 and 14' can process articles regardless of their allocation feature A, B, and C, the articles in the section B are unsorted in respect of their allocation feature A, B, and C. After the articles have been forwarded or guided to the lanes G1, G2, or G3, the articles outside of the section B are sorted. In contrast to this, it may be possible that an arranging process is already performed by the third delivery unit and/or transfer unit 3" or that articles are guided via the third delivery unit and/or transfer unit 3" to a processing station 14 or 14', respectively, or to a labeling apparatus 15 or 15', respectively, in each instance in dependence on the allocation feature A, B, or C of the articles. In this context, the labeling apparatuses 15 or 15' possess one or more different labeling units 16. In addition, a third processing station 14", which in this instance takes the form of the manufacturing station 17, is arranged upstream of the third delivery unit and/or transfer unit 3". The manufacturing station 17 may be a stretch blow molding machine, for instance, or one or more other stations. In the exemplary embodiment in FIG. 1, articles are transported in three lanes leading away from the third processing station 14" or the manufacturing station 17 and in two lanes after the third delivery unit and/or transfer unit 3". Via the control unit S, the third processing station 14" is brought into an operative connection with the buffer stations P1 and P2 and P3 in such a manner that a signal is output to the manufacturing station 17 on exceeding or falling below a certain number of stored articles. The manufacturing station 17 then either guides articles with the respective allocation feature A, B, or C to the respective buffer station P1, P2, or P3 via the processing stations 14 and 14' and along the mass flows M1 and M2, or the manufacturing station 17 suppresses guiding the articles with the respective allocation feature A, B, or C to the respective buffer station P1, P2, or P3. It is thus possible to ensure that the buffer stations P1 and P2 and P3 always have a sufficient number of articles with the respective allocation feature A, B, or C to be able to always supply the downstream delivery unit and/or transfer unit 3' with the sufficient number of articles with the allocation feature A, B, and C for forming the compilation. It is obvious to the expert that different devices may be employed for the handling station 10 as well as for the processing stations 14. For instance, the handling station 10 and the processing stations 14, 14', and 14" may take the form of a stretch blow molding machine and/or a labeling apparatus and/or a filling station and/or a packing station and/or of other stations.

FIG. 2a shows a schematic view of two compilations Z1 and Z2 of articles with different allocation features A, B, and C such as may be formed by the method according to the invention and the system 1 according to the invention. The compilations Z1 and Z2 each comprise articles, which are transported on a first conveying section T1 and further articles, which are transported on a conveying section T2. Here, the articles of the first conveying section T1 are transported adjacent to the articles of the second conveying section T2. The horizontal conveying device H already shown in FIG. 1 can be seen here, with the horizontal conveying device H being used for transporting the articles on the conveying sections T1 or T2 and with the transport direction TR of the articles indicated. In this instance, three first compilations Z1 and subsequently one second compilation Z2 have been formed by means of the downstream delivery unit and/or transfer unit 3' or the distribution star 6' shown in FIG. 1. As can be seen, the first compilation Z1 and the second compilation Z2 each comprise six articles. In the exemplary embodiment in FIG. 2a, an identical number of articles was defined and selected for the first compilation Z1 and for the second compilation Z2, this may, however, also be a different number in other embodiment forms. It is obvious that other compilations may also follow the compilation Z2 or that other compilations may also precede the compilation Z1, which other compilations differ from the compilations Z1 and Z2 shown here in respect of the number of articles and the arrangement regarding their respective allocation feature A and/or B and/or C. The compilation Z1 comprises four articles with the allocation feature A and two further articles, one with the allocation feature B and the other one with the allocation feature C. The compilation Z2 comprises 5 articles with the allocation feature A and one further article with the allocation feature B. The articles with the allocation feature A pertain to a first beverage variety, the articles with the allocation feature B to a second beverage variety, and the articles with the allocation feature C to a third beverage variety. The transport sequence of articles in the direction of transport TR and the arrangement of the articles, respectively, is defined and specified in dependence on their allocation feature A, B, and C and the specified compilation Z1 or Z2. A compilation Z1 or Z2 may comprise a plurality of articles being transported next to each other and on different conveying sections T1 and T2 and having the same or different allocation features. There may also be a "gap" in transport direction TR between individual articles or between individual compilations Z1, Z2, with the result that the articles or the compilations Z1, Z2 are not lined up immediately abutting on each other.

FIG. 2b shows a further schematic view of two compilations Z1' and Z2' of articles with different allocation features A, B, and C such as may be formed by the method according to the invention and the system 1 according to the invention. Here, the compilation Z1' comprises only articles with the allocation feature A. In contrast, the compilation Z2', which was formed at a later point of time by means of the downstream delivery unit and/or transfer unit 3' (cf. FIG. 1), comprises articles with the allocation features A, B, and C. After forming a compilation Z1', the buffer station P1, which is provided for storing articles, is capable of removing articles with the allocation feature A and thus of supplying a sufficient number of articles with the allocation feature A to the downstream delivery unit and/or transfer unit 3' for forming the specified compilation Z1'. No articles with the allocation feature B and C are removed from the other buffer stations P2 and P3 in this instance, as these articles are not required for the compilation Z1'. If the compilation Z2' is subsequently to be formed, the buffer stations P2 and P3 can also remove articles with the allocation feature B and C, thus making it is possible to form the compilation Z2' by means of the delivery unit and/or transfer unit 3'. The removal of articles with the respective allocation feature A, B, and C from the respective buffer stations P1, P2, and P3 may be conducted in such a manner that the articles with the allocation feature A, B, and C are removed in the exact number required for forming the respective compilation Z1' or Z2' by means of the downstream delivery unit and/or transfer unit 3'. As the case may be, a control unit S (cf. FIG. 1) may be provided for controlling one or more processing stations 14, 14', and/or 14" and for feeding articles to the respective buffer stations P1, P2, and/or P3 in consideration of the compilation Z1' and Z2', respectively.

Figure 3:
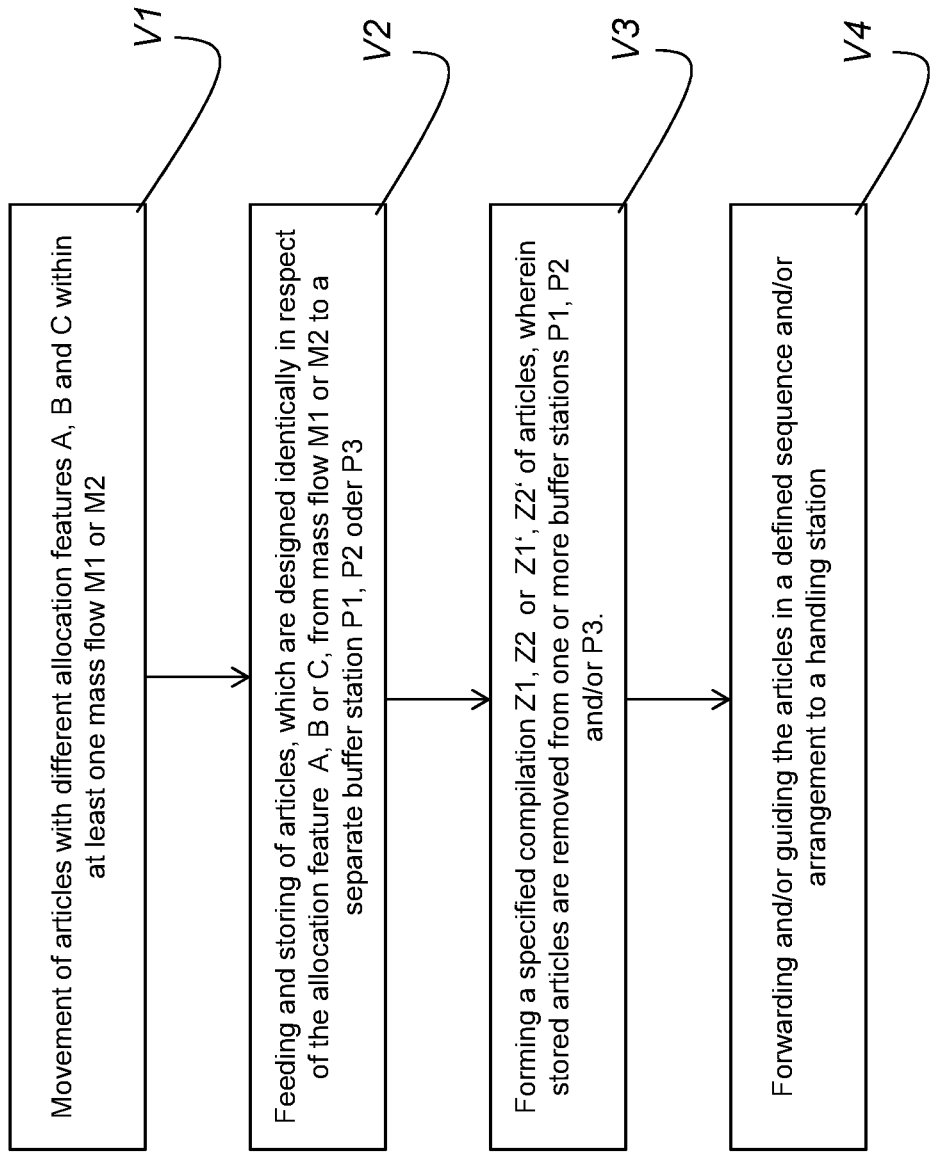
FIG. 3 renders a flowchart of individual steps such as may be the object of the method according to the invention or such as may be implemented by the system according to the invention.

FIG. 3 renders a flowchart of individual steps V1-V4 such as may be the object of the method according to the invention or such as may be implemented by the system 1 according to the invention. Thus, in a first process step V1, articles with different allocation features A, B, and C are moved in at least one mass flow M1, preferably, however, in at least two mass flows M1 and M2. Then, articles identically designated in respect of an allocation feature A, B, or C are fed to a separate buffer station P1, P2, or P3 from the at least one mass flow M1 and M2. This process of feeding may be conducted, as shown in FIG. 1, through a delivery unit and/or transfer unit 3 and via the lanes G1, G2, and G3, which are assigned to the buffer stations P1, P2, and P3. Then, in a further process step V3, a specified compilation Z1 or Z2 and Z1' or Z2', respectively (cf. FIG. 2a and FIG. 2b), is formed. For this purpose, articles are removed from one or more of the buffer stations P2, P2, and/or P3. In a further process step V4, the articles are forwarded and/or guided to the handling station 10 (cf. FIG. 1) in the defined sequence and arrangement. For instance, the articles may be forwarded and/or guided by a downstream delivery unit and/or transfer unit 3', as is shown in the exemplary embodiment in FIG. 1. In a preferred embodiment of the present invention, the delivery unit and/or transfer unit 3' may take the form of a distribution star 6'.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

1 System
3 Delivery unit and/or transfer unit
5 Sensor system
6 Distribution star
8 Discharge belt
10 Handling station
13 Filling station
14 Processing station
15 Labeling apparatus
16 Labeling unit
17 Manufacturing station
20 Sensor system
A—Allocation feature
C
E End section
G Lane
H Horizontal conveying device
M Mass flow
P Buffer station
S Control unit
T Conveying section
TR Transport direction
V Process steps
Z Compilation

We claim:
1. A method comprising:
processing with at least one processing station (14, 14', 14") or manufacturing with at least one manufacturing station (17), a plurality of containers wherein each container has one or more allocation features (A, B, C),
feeding the plurality of containers into at least one mass flow (M1, M2) and moving the plurality of containers from the at least one mass flow (M1, M2) through a first delivery unit or transfer unit (3),
feeding containers identically designated in respect to at least one allocation feature (A, B, C) to separate buffer stations (P1, P2, P3) from the first delivery unit or transfer unit (3) and storing the containers in the buffer stations (P1, P2, P3),
removing containers with the same allocation feature from the separate buffer stations (P1, P2, P3) to a lane end section (E1, E2, E3) located downstream from each of the buffer stations,
forwarding the containers from the lane end sections (E1, E2, E3) to a second delivery unit or transfer unit (3') in a defined sequence or arrangement to form a specified compilation (Z1, Z2) of containers, and
transferring the specified compilation (Z1, Z2) of containers to one or more horizontal conveying devices, which lead toward a handling station (10),
wherein, when the number of containers stored in one or more buffer stations (P1, P2, P3) falls below a certain number, outputting a signal from a control unit (S) to the at least one processing station (14, 14', 14") or the at least one manufacturing station (17), wherein the signal identifies the one or more buffer stations (P1, P2, P3) which require additional containers, and
subsequent to receiving the signal from the control unit, the at least one processing station (14, 14', 14") or the at least one manufacturing station (17) processes or manufactures at least one container having the allocation feature (A, B, C) of the one or more buffer stations (P1, P2, P3) which require additional containers, and then feeding the processed or manufactured containers having the allocation feature (A, B, C) of the one ore more buffer stations (P1, P2, P3) which require additional containers into the at least one mass flow (M1, M2) and then feeding the containers having the allocation feature (A, B, C) of the one ore more buffer stations (P1, P2, P3) which require additional containers to the one or more respective buffer stations (P1, P2, P3) which number of containers fell below the certain number.

2. The method as recited in claim 1 wherein the allocation features (A, B, C) of each of the containers is recorded by a sensor before the containers are fed to the buffer stations (P1, P2, P3) or before the specified compilation (Z1, Z2) is formed.

3. The method as recited in claim 1 wherein containers identically designated in respect to at least one allocation feature (A, B, C) are fed from the mass flow (M1, M2) through the first delivery unit or transfer unit (3) to separate lanes (G1, G2, G3), and then fed to the separate buffer stations (P1, P2, P3) along the respective lanes (G1, G2, G3).

4. The method as recited in claim 3 wherein multiple containers with a different allocation feature (A, B, C) are conveyed together in the at least one mass flow (M1, M2).

5. The method of claim 4 wherein the at least one processing station (14, 14',14") comprises a labeling apparatus, a filling apparatus, a container manufacturing apparatus, or combinations thereof.

6. The method as recited in claim 5 wherein a plurality of parallel processing stations (14, 14') is provided for processing the containers and wherein the containers are forwarded or guided to respectively one of the processing stations (14, 14').

7. The method as recited in claim 6 wherein the containers are forwarded to the respective processing station (14, 14') or guided to the respective processing station (14, 14') in dependence on their allocation feature (A, B, C).

* * * * *